United States Patent
Adams et al.

[15] 3,697,017
[45] Oct. 10, 1972

[54] FILM TRANSPORT DECK UNIT

[72] Inventors: Lloyd M. Adams, Santa Ana; Robert L. Hoelscher, San Diego, both of Calif.

[73] Assignee: Cubic Corporation, San Diego, Calif.

[22] Filed: July 23, 1971

[21] Appl. No.: 165,632

[52] U.S. Cl. .................242/189, 226/181, 242/205, 242/209
[51] Int. Cl. ......B65h 59/38, B65h 63/02, G03b 1/04
[58] Field of Search.....................242/189, 190–191, 242/205, 206, 209; 226/181–188, 190

[56] References Cited

UNITED STATES PATENTS

| | | |
|---|---|---|
| 2,725,200 | 11/1955 | Ward........................242/189 |
| 2,854,198 | 9/1958 | Lubkin et al. .............242/190 |
| 3,016,207 | 1/1962 | Comstock..................242/206 |

*Primary Examiner*—Leonard D. Christian
*Attorney*—Carl R. Brown et al.

[57] ABSTRACT

A film transport deck unit having a driven supply capstan and a driven film advance capstan, each with a pinch roller in driving contact with its capstan to prevent slippage. In each capstan and pinch roller combination, the emulsion side of the film is held against a polished surface of one element and driven by a frictional surface of the other element. Film supply and take-up is controlled by sensing means having no physical contact with the film or the drive means. The unit is adaptable to existing camera and control apparatus.

11 Claims, 6 Drawing Figures

PATENTED OCT 10 1972 3,697,017

INVENTORS
LLOYD M. ADAMS
ROBERT L. HOELSCHER
BY
Brown & Martin
ATTORNEYS

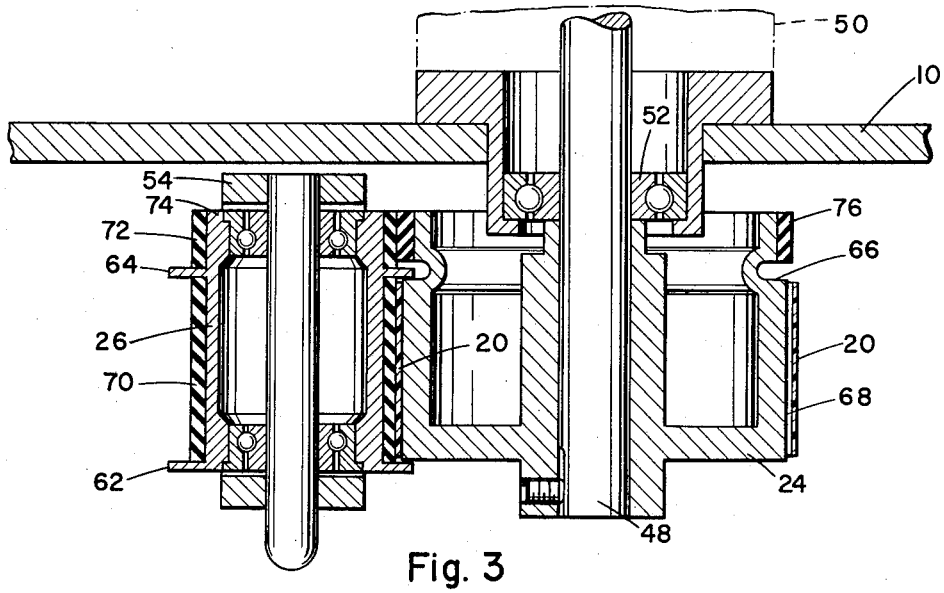
Fig. 3
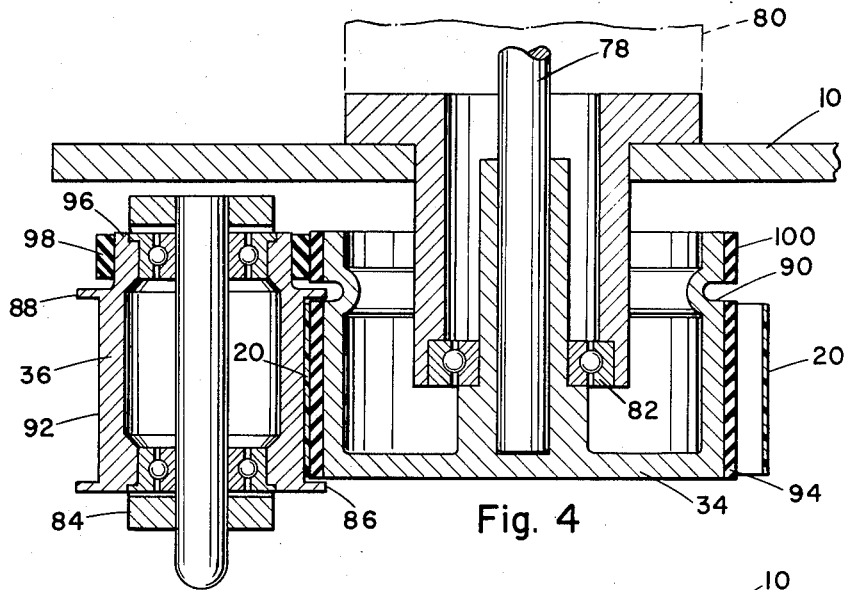
Fig. 4
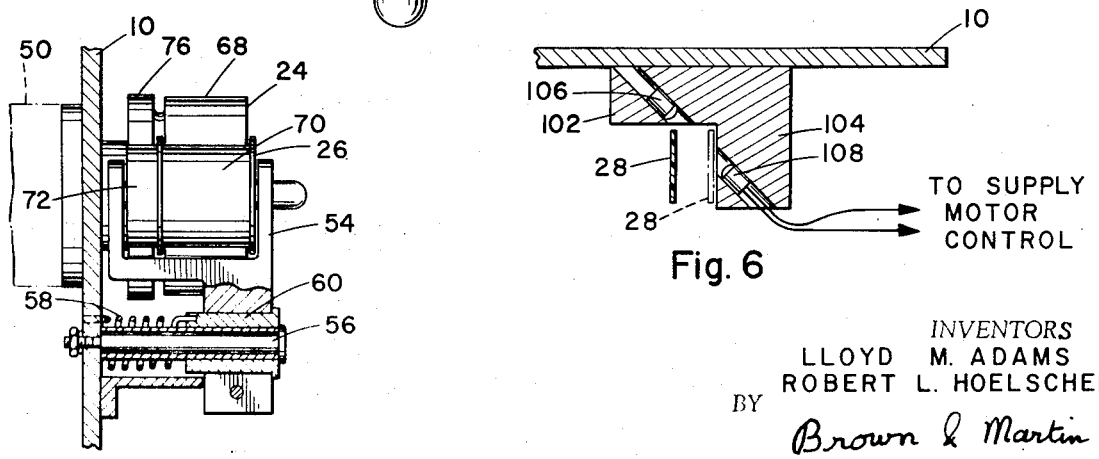
Fig. 5
Fig. 6
TO SUPPLY
MOTOR
CONTROL
INVENTORS
LLOYD M. ADAMS
ROBERT L. HOELSCHER
BY Brown & Martin
ATTORNEYS

FILM TRANSPORT DECK UNIT

BACKGROUND OF THE INVENTION

Film transport system for non-perforated film usually use some type of capstan and pinch roller mechanism to grip and drive the film, the driven capstan advancing the film and the freely rotatable pinch roller being turned by frictional contact with the film. The film is advanced through an exposure gate in single frame increments, and at high speeds the accelerations are quite severe, resulting in slippage of the film and possible damage to the surfaces. Slippage can also occur between the capstan and pinch roller due to the inertia of high speed intermittent rotation. If the pinch roller is spring loaded sufficiently to prevent slipping, the pressure on the film is excessive and more power is required to drive the film.

In the usual camera configuration, a driven supply capstan pulls film from a supply magazine, another driven capstan advances the film through the exposure gate and the reel in the take-up magazine is driven to take up the exposed film. The advance capstan is driven by a stepping motor controlled electronically in synchronization with the display of subject matter to be recorded. To avoid undue tension on the film, the supply capstan is driven to maintain a free loop of film ahead of the gate, and another loop is maintained between the advance capstan and the take-up reel. Operation of the supply and take-up drive means is controlled independently of the advance capstan, to ensure that adequate loops exist in the film. In most instances some type of film follower, such as a roller or feeler, is used to sense the presence of a loop and actuate a switch to control the respective drive motor. Such mechanical systems can cause damage to the film and are unreliable at the high rate of film advancement used in some cameras.

SUMMARY OF THE INVENTION

The film transport unit described herein is constructed on a flat deck plate and includes a driven advance capstan and pinch roller which advances film through an exposure gate, the film being drawn from the a magazine by a driven supply capstan and pinch roller. The supply capstan has a polished surface, against which the emulsion side of the film is held by the frictional covering of the pinch roller, the capstan and pinch roller being maintained in rotational synchronization by a resilient frictional drive coupling. The advance capstan and its pinch roller also have a resilient frictional driving coupling, but the pinch roller has the polished surface to contact the emulsion side of the film, and the capstan has the frictional driving covering. Both capstan and pinch roller combinations thus drive the film without slippage or damage.

The advance capstan drive is controlled electronically in synchronization with subject matter displayed for the camera, the film being advanced intermittently in single frame increments. To avoid undue tension on the film, a free loop is maintained adjacent the supply capstan, the drive of which is controlled by the size of the loop. This is accomplished by means of an electro-optic sensor, which is obstructed by an excess of film in the loop to shut off the supply drive. When the loop size is reduced, the sensor is unobstructed and causes the supply drive to operate and replenish the loop. Between the advance capstan and the take-up magazine, another film loop is maintained by a roller carried on a spring loaded arm, which causes an electro-optic sensor to be energized when a suitable loop exists, and allows the take-up drive to operate. When the loop is reduced below a safe size, the sensor is obstructed and the take-up drive is shut off. There is no physical contact between either of the sensors and the film or the film drive, so there is no possibility of interference or damage to the film. The deck unit is ver simple and is adaptable to existing camera and control equipment.

The primary object of this invention, therefore, is to provide a new and improved film transport deck unit.

It is another object of this invention to provide a new and improved film transport deck unit having positive non-slip drive means for the film.

It is a further object of this invention to provide a new and improved film transport deck unit having control means for maintaining tension relieving loops in the film, without interfering with the film or drive means.

Other objects and many advantages of this invention will become more apparent upon a reading of the following detailed description and an examination of the drawings, wherein like reference numerals designate like parts throughout and in which:

FIG. 3 is an enlarged sectional view taken on line 3—3 of FIG. 1.

FIG. 4 is an enlarged sectional view taken on line 4—4 of FIG. 1.

FIG. 5 is a sectional view taken on line 5—5 of FIG. 1.

FIG. 6 is a sectional view taken on line 6—6 of FIG. 1.

DESCRIPTION OF THE PREFERRED EMBODIMENT

Figure 1:
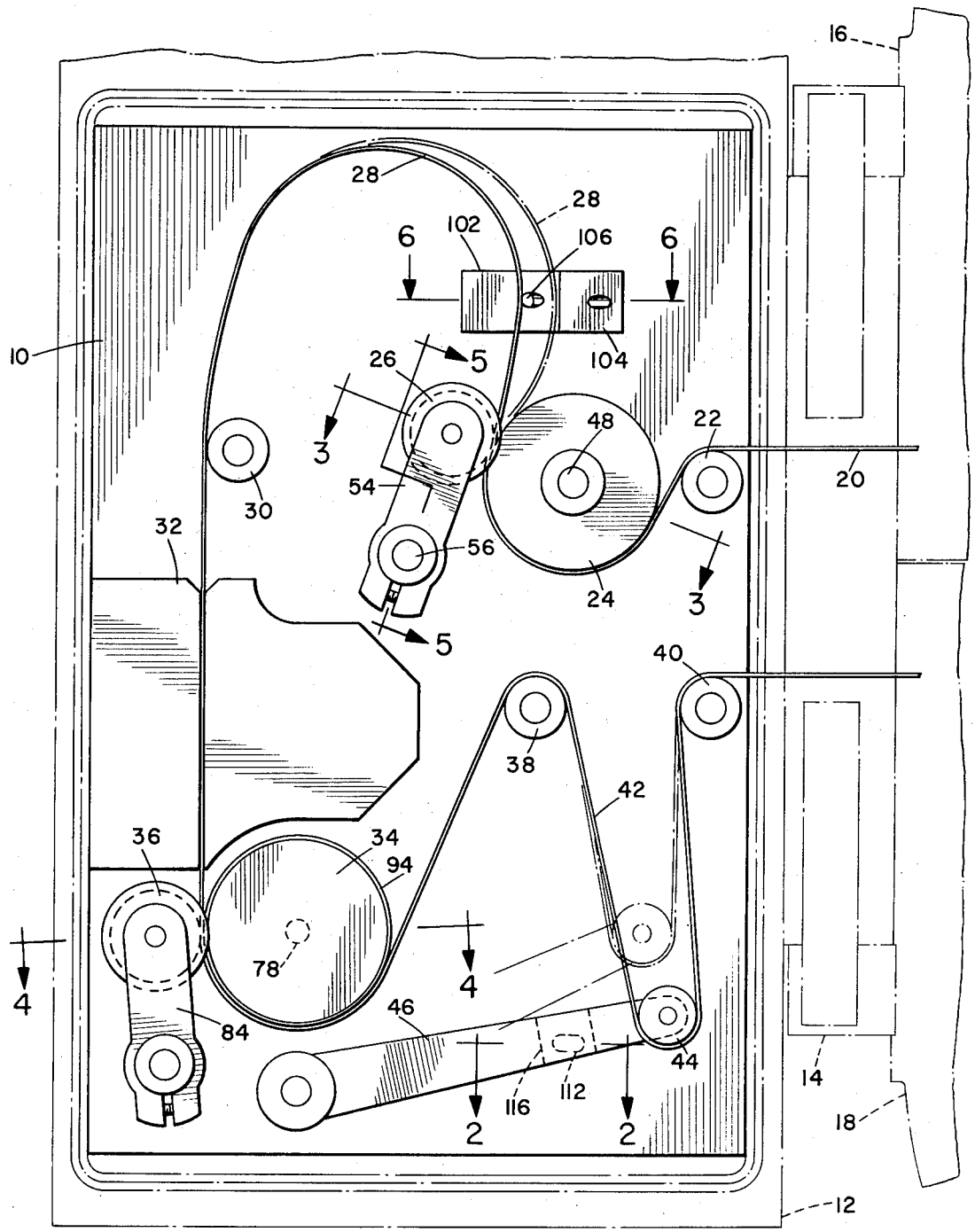
FIG. 1 is a side elevation view of the complete deck unit.

The unit is completely constructed on a deck plate 10, illustrated as a flat rectangular plate to be mounted in a camera casing. A portion of a camera casing 12, magazine holder 14, supply magazine 16 and take-up magazine 18, are indicated in broken line in FIG. 1. The structure is shown and described in more detail in copending application Ser. No. 90,982, filed Nov. 19, 1970 and entitled "Film Transport Unit." The drive assembly includes a take-up motor, which is contained in the camera casing and couples to the reel in the take-up magazine 18 when the magazine is secured on holder 14, the arrangement being well known.

Film 20 from supply magazine 16 enters the camera casing and passes over an idler roller 22 freely rotatably mounted on deck plate 10. The film then passes around a supply capstan 24 and is held thereon by a pinch roller 26, the film extending above the supply capstan in a loop 28 and returning over an idler roller 30 to the exposure gate 32. From the gate the film passes around a drive or advance capstan 34 and is held thereon by a pinch roller 36, and continues over a pair of idler rollers 38 and 40 to the take-up magazine 18. Between rollers 38 and 40 the film is pulled down in a take-up loop 42 by a tension roller 44 carried on a spring loaded arm 46, pivotally mounted on the deck plate to swing parallel to the plate.

The supply capstan 24 is secured to the shaft 48 of a supply motor 50 and is supported in a bearing 52 mounted on deck plate 10, as in FIG. 3. Pinch roller 26 is freely rotatably mounted in a fork 54, which swings on a hinge pin 56 projecting from deck plate 10 parallel to the axis of the supply capstan. The pinch roller is biased against the supply capstan by a torsion spring 58 wound around hinge pin 56 and anchored in deck plate 10 and a hub 60, on which fork 54 is secured, as in FIG. 5. Pinch roller 26 has radially projecting flanges 62 and 64, spaced to fit the width of the film, flange 62 overlapping the outer face of supply capstan 24 and flange 64 fitting into an annular channel 66 in the capstan. The annular face 68 of supply capstan 24 is highly polished to avoid damage to the emulsion surface of the film, driving contact with the film being provided by a sleeve 70 of frictional material, such as synthetic rubber or the like, preferably in the form of a coating bonded on pinch roller 26 between the flanges. A sleeve extension 72, of similar frictional material, is secured on the extended portion 74 of pinch roller 26, outside flange 64. This sleeve extension is held in frictional driving contact with a drive ring 76 secured on supply capstan 24 outside channel 66. The drive ring 76 is of rubbery material or the like, with sufficient thickness and resiliency to maintain a positive driving contact with sleeve extension 72, while the film is held in firm driving contact between the pinch roller and capstan.

The advance capstan 34 is secured to the shaft 78 of an advance motor 80 and is supported in a bearing 82 on deck plate 10, as in FIG. 4. Pinch roller 36 is freely rotatably mounted in a fork 84, similar in construction and spring biased mounting to that shown in FIG. 5. The pinch roller 36 has flanges 86 and 88 which straddle the film, flange 86 overlapping the outer end of advance capstan 34 and flange 88 riding in an annular channel 90 in the capstan. After passing through gate 32, the emulsion side of the film is toward pinch roller 36, so the annular surface 92 of the pinch roller between the flanges is highly polished. The portion of capstan 34 which fits between flanges 86 and 88 carries a frictional sleeve 94 which provides the driving grip on the film. Pinch roller 36 has an extended portion 96, on which is secured a resilient drive ring 98. The drive ring makes positive frictional driving contact with a sleeve extension 100 fixed on capstan 34, outside the channel 90.

Advance motor 80 is usually a precision stepping motor which is controlled by electronic signals from the subject matter display portion of the apparatus. The film is thus advanced in increments of one frame in synchronization with the presentation of individual images to be recorded and the frame rate may vary. Thus the film supply speed is not necessarily constant and variations are accommodated by the supply loop 28. To maintain the loop at a suitable size, a sensor unit 102 is mounted on deck plate 10 above the supply capstan. The sensor unit comprises a mounting block 104, or similar structure, in which is a light source 106 directing light to a photoelectric detector 108, along a path inclined to the plane of the film. Light source 106 may be a light emitting diode with a low level output of a wavelength which will not affect the film emulsion. Detector 108 is a photo diode, which is connected to the control circuit of supply motor 50. If too much film is pulled from the supply magazine, the supply loop will become enlarged, as indicated in broken line in FIGS. 1 and 6, and obstruct the light to detector 108. This results in supply motor 50 being shut off until the loop size is reduced and the light path is again unobstructed.

Figure 2:
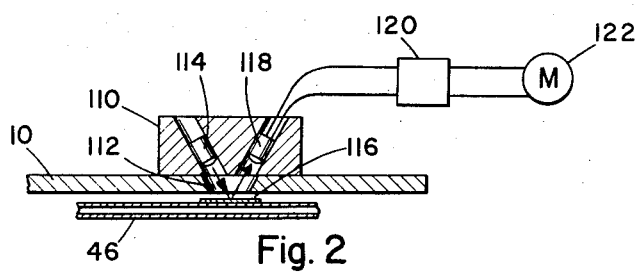
FIG. 2 is a sectional view taken on line 2—2 of FIG. 1.

The take-up motor must also be controlled to prevent the film from being wound up faster than the advance capstan is driving. This is accomplished by a sensor unit 110 which detects motion of the arm 46 and thus the size of the take-up loop 42. Sensor unit 110 is mounted behind an opening 112 in deck plate 10, the opening being covered by arm 46 when the take-up loop is of suitable size. In the sensor unit is a light source 114 which directs light onto a reflector 116 on arm 46, and a detector 118 which receives the reflected light, as in FIG. 2. When film is taken up too rapidly, the tension pulls spring loaded arm 46 up, as indicated in broken line in FIG. 1. This removes the reflector 116 from the light path and the drop in output of detector 118, which is connected to control means 120 for the take-up motor 122, causes the take-up motor to be shut off until sufficient film accumulates in the take-up loop to allow the arm to fall into the sensor light path.

The supply and take-up drive means are thus actuated on a demand basis without the use of mechanism which would interfere with the drive or damage the film. Film damage is also minimized by the drive coupling between each capstan and its pinch roller, which prevents slipping or skidding of the pinch roller. Since the film is driven from both sides between the coupled elements, the pinch pressure can be minimized and the power requirement reduced. The particular frictional drive between a resilient ring and a sleeve is simple yet reliable and elements are easily replaced when worn. Proper choice of the material for the drive rings will allow the unit to handle films of different thicknesses, within the range normally used.

Having described our invention, we now claim:

1. A film transport deck unit, comprising:
   a deck plate;
   a film conducting exposure gate fixed on said deck plate;
   a supply capstan rotatably mounted on said deck plate and having drive means coupled thereto;
   a supply pinch roller mounted adjacent said supply capstan and biased to hold film therebetween with a driving grip;
   said supply capstan and pinch roller having a rotatable driving interconnection, independent of the common contact with the film;
   a film advance capstan rotatably mounted on said deck plate adjacent said gate and having drive means for advancing the film in repetitive increments;
   an advance pinch roller mounted adjacent said advance capstan and biased to hold film therebetween with a driving grip;
   said advance capstan and pinch roller having a rotatable driving interconnection independent of the common contact with the film.

2. A film transport deck unit according to claim 1 wherein, in each capstan and pinch roller combination, one element thereof has a polished surface for contact with the emulsion side of the film, and the other element has a frictional driving surface.

3. A film transport deck unit according to claim 1 wherein, in each capstan and pinch roller combination, the driving interconnection includes a frictional sleeve on one element thereof, and a resilient drive ring on the other element for frictional rolling contact with the sleeve when a film is interposed between the elements.

4. A film transport deck unit according to claim 1, wherein said supply capstan has a polished annular surface for contact with the emulsion surface of a film; and said supply pinch roller having flanges straddling said supply capstan with an annular frictional sleeve between said flanges.

5. A film transport deck unit according to claim 4, wherein said supply pinch roller has an extended portion at one end, with a friction sleeve extension thereon; and said driving interconnection comprising a resilient drive ring on said supply capstan for rolling frictional contact with said sleeve extension.

6. A film transport deck unit according to claim 5, wherein said advance pinch roller has flanges spaced to contain the film, with a polished annular surface between the flanges;

and said advance capstan having an annular frictional sleeve fitting between said flanges.

7. A film transport deck unit according to claim 6, wherein said advance capstan has a frictional sleeve extension thereon; and said driving interconnection comprising a resilient drive ring on said advance pinch roller, externally of the flanges, for rolling frictional contact with said sleeve extension.

8. A film transport deck unit according to claim 1, wherein said supply drive means is actuated independently of said advance drive means for maintaining a supply loop of film between the supply capstan and said gate;

and loop size sensing means mounted adjacent said supply capstan with connection to said supply drive means for maintaining a substantially constant loop.

9. A film transport deck unit according to claim 8, wherein said sensing means comprises a light source and a light detector, the light path therebetween being obstructed by a film loop of excessive size.

10. A film transport deck unit according to claim 9, and including film take-up drive means operable independently of said advance drive means;

means adjacent said advance capstan for holding a take-up loop of film;

and sensing means for sensing the size of said take-up loop, with connection to said take-up drive means for maintaining a substantially constant loop.

11. A film transport deck unit according to claim 10, wherein said loop holding means includes an arm pivotally mounted on said deck plate, with a film holding roller thereon;

said sensing means including a light source for directing light to a reflective portion of said arm, and a light detector positioned to receive reflected light, said arm being in the reflecting position when the take-up loop is normal.

* * * * *